United States Patent [19]
Arvidsson

[11] Patent Number: 5,865,356
[45] Date of Patent: Feb. 2, 1999

[54] DEVICE FOR FASTENING ONTO A VEHICLE, A LOAD CARRIER

[75] Inventor: Jan-Ivar Arvidsson, Hillerstorp, Sweden

[73] Assignee: Industri AB Thule, Hillerstorp, Sweden

[21] Appl. No.: 51,800

[22] Filed: Apr. 26, 1993

Related U.S. Application Data

[63] Continuation of Ser. No. 634,131, Jan. 4, 1991, abandoned.

[30] Foreign Application Priority Data

May 23, 1989 [SE] Sweden ................................. 8901826
May 8, 1990 [WO] WIPO ...................... PCT/SE90/00299

[51] Int. Cl.⁶ ..................................................... B60R 9/052
[52] U.S. Cl. ............................ 224/329; 224/309; 224/322
[58] Field of Search .................................... 224/329, 330, 224/331, 917, 322, 323, 309, 325, 326

[56] References Cited

U.S. PATENT DOCUMENTS 4,723,696  2/1988  Stichweh et al. ....................... 224/331

FOREIGN PATENT DOCUMENTS

| | | |
|---|---|---|
| 177758 | 4/1985 | European Pat. Off. . |
| 278435 | 2/1988 | European Pat. Off. . |
| 2933718 | 3/1981 | Germany . |
| 3034226 | 4/1982 | Germany . |
| 3018424 | 5/1982 | Germany . |
| 3306360 | 9/1984 | Germany . |
| 3317407 | 11/1984 | Germany ................................ 224/309 |
| 3614740 | 5/1987 | Germany . |
| 3612332 | 10/1987 | Germany ................................ 224/326 |
| 457073 | 8/1985 | Sweden . |
| 2 147 860 | 5/1985 | United Kingdom . |
| 2 175 862 | 12/1986 | United Kingdom . |
| WO89/00519 | 1/1989 | WIPO . |
| 8901826-1 | 5/1989 | WIPO . |

*Primary Examiner*—Linda J. Sholl
*Attorney, Agent, or Firm*—Royston, Rayzor, Vickery, Novak & Druce

[57] ABSTRACT

A device for fastening onto a vehicle a load carrier of the type provided with a strut extending transversely across the vehicle roof, support feet disposed at the ends of the strut and abutting against the vehicle roof, and clamping units which, for fastening the load carrier to the vehicle roof, are movable in clamping directions substantially transversely of the direction of travel of the vehicle. The device includes securement means having engagement members which are designed for interconnection with corresponding engagement members on the clamping units. The securement means have narrow neck portions which extend behind decoration or sealing strips on the vehicle. The securement means are provided with anchorage portions which are anchored on the vehicle.

6 Claims, 2 Drawing Sheets

1

DEVICE FOR FASTENING ONTO A VEHICLE, A LOAD CARRIER

This application is a continuation of application Ser. No. 07/634,131, filed Jan. 4, 1991, now abandoned.

TECHNICAL FIELD

The present invention relates to a device for fastening onto a vehicle such a load carrier as is provided with a strut extending transversely over the vehicle roof, support feet which abut against the vehicle roof and which transfer thereto the loading of the load carrier, and clamping units which, for fastening the load carrier onto the vehicle, are movable in a clamping direction substantially transversely of the longitudinal direction of the vehicle.

BACKGROUND ART

Such devices for fastening a load carrier onto a vehicle are previously known in this Art. In these devices, the clamping units are often designed as catches which extend with a shank, for example into a door opening to the vehicle body so that the clamping unit hereby grasps about a more or less distinct corner portion between that wall which defines the door opening and a roof surface on the vehicle body connecting therewith.

In many modern vehicle bodies, the above-considered clamping technique is not possible since the above-mentioned corner region between the vehicle roof and the wall portion defining the door opening does not have the correct alignment or is not so distinct that the clamping unit can exercise any grip.

In other vehicle designs, the vehicle door extends up into the side edge area of the roof, for which reason no distinct edge portion exists at all about which the clamping unit may grasp.

The problems of fastening load carriers to vehicle bodies of the above-outlined types are so great that no hestitation has been shown in this Art in accepting the costs of providing, recessed in the roof, specific anchorages for the load carriers. Naturally, this involves complications in design and construction, and also considerably greater expense. Furthermore, such special anchorages are not suited for fastening of other than certain make-specific load carriers.

PROBLEM STRUCTURE

The object of the present invention is to realize a device of the type mentioned by way of introduction, the device being designed in such a manner that the load carrier can also be fastened onto such vehicle body types in which this has earlier proved impossible. The present invention further has for its object to realize a device which permits permanent fastening of a clamping unit on the body without any modificational intervention therein so that, after mounting of such a clamping unit, the load carrier proper may readily be mounted and dismounted without the clamping unit marring the appearance of the vehicle body or causing any appreciable air resistance. The present invention further has for its object to realise a device which, at low cost, provides for fastening of the load carrier in a manner which affords optimum mechanical strength and an aesthetically attractive appearance.

SOLUTION

The objects forming the basis of the present invention are attained if the device intimated by way of introduction is characterised in that the clamping units have engagement members for interconnection with corresponding engagement members on securement means provided with neck portions which are moved into regions behind masking or sealing strips on the vehicle, where the securement means are anchored in the vehicle by anchorage portions.

As a result of this design of the securement means, it is possible to fasten, with the anchorage portions, the securement means in behind the decoration or masking strips which are intended to conceal a joint provided in the vehicle body where, for instance, two mutually superposed body panels are welded together.

In one embodiment of the device according to the present invention, the anchorage portions are suitably disposed, in a load-tranferring manner in the clamping direction, at least partly to surround or fixedly hook over a projecting portion of the vehicle body and the securement means are held in this position by cooperation with the masking or sealing strip.

As a result of this design, use is made of an already existing strip to hold the securement means in place in a position permanently mounted on the body. On the other hand, in terms of mechanical strength, the loadings between the securement means are transferred directly to the projecting portion on the vehicle body.

In a second embodiment of the device according to the present invention, the anchorage portions are suitably lamellar in configuration and are disposed between a strip and an adjacent portion of the vehicle body and are fixed in this position in that fastening devices for the strip also fasten the anchorage portions in the vehicle body.

In yet a further embodiment of the device according to the present invention, the anchorage portions are suitably provided with a catch-like portion which, in the clamping direction, is operative to fixedly catch the securement means on a projecting portion of the vehicle body, and the anchorage portions are suitably provided with a locking portion extending towards the catch-like portion and, on fixedly catching of the securement means, disposed to snap or be bent in behind an angularly deflected edge area on the projecting portion of the vehicle body.

In this embodiment, no direct cooperation between the masking or sealing strip is required for fixedly clamping the securement means, this instead being provided with a snap union by means of which it is fixedly hooked onto the body.

BRIEF DESCRIPTION OF THE ACCOMPANYING DRAWINGS

The nature of the present invention and its aspects will be more readily understood from the following brief description of the accompanying Drawings, and discussion relating thereto.

DESCRIPTION OF PREFERRED EMBODIMENT

Figure 1:
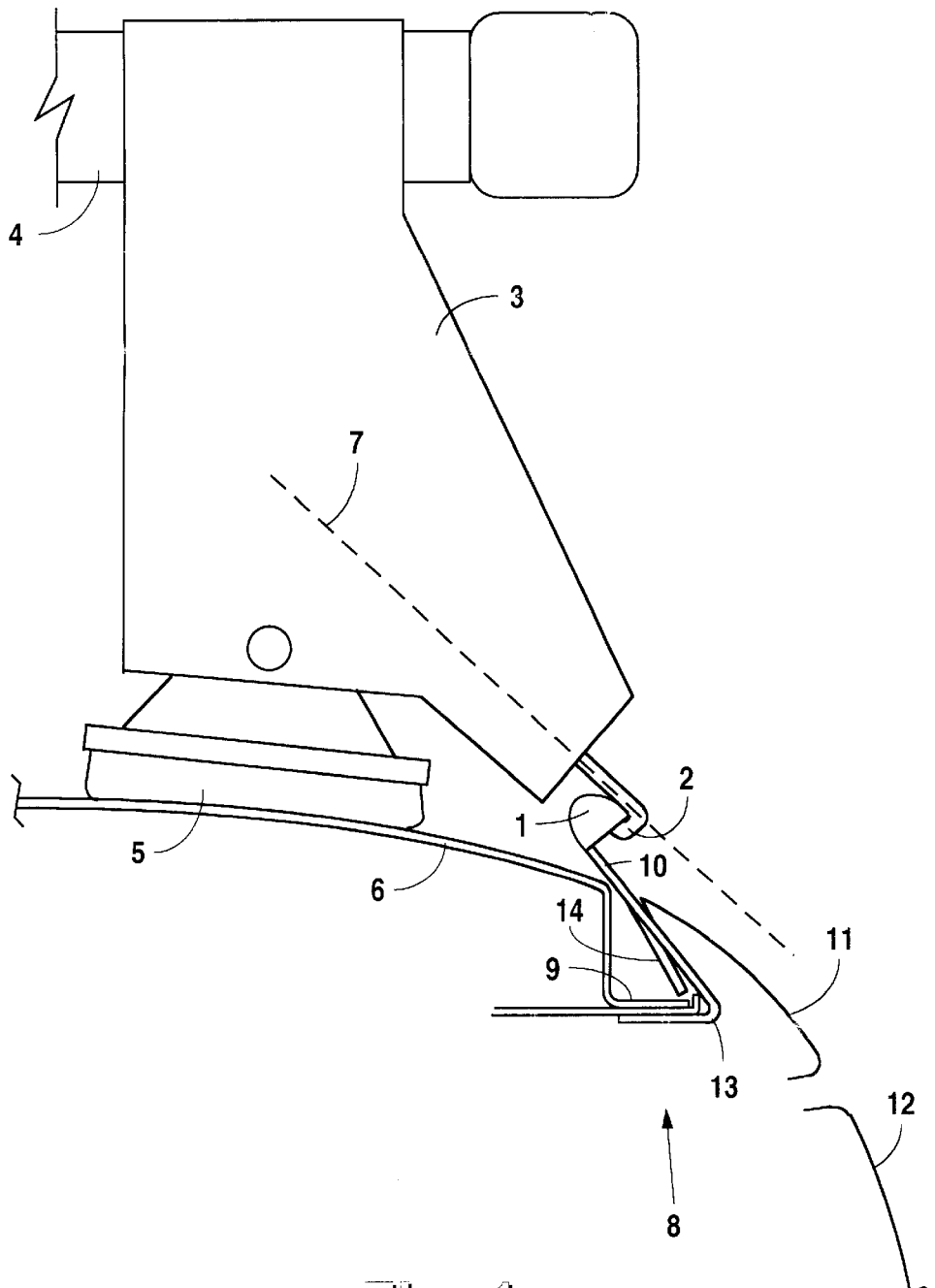
FIG. 1 is a schematic cross section through a transitional region between a vehicle roof and one side wall of the vehicle, the load carrier being also schematically illustrated.

Those vehicle bodies on which the device according to the present invention is primarily conceived for application are of such design that conventional fastening of load carriers has proved to be impossible to put into practice with sufficiently good results. This implies that the vehicle bodies lack such distinct edge portions as are required for fixed clamping using conventional means. Irrespective of the appearance of the body itself, there are, as a rule, in the region between the side wall of the body and its roof, a number of reinforcement beams, longitudinal joints between panels included in the body and the like. Often, the longitudinal panel joints consist of superposed sheets which, by welding, are joined together along a strip shaped joint portion extending in the longitudinal direction of the vehicle, which joint portion may be employed for fixedly securing, for example, a sealing strip for a vehicle door. In other cases, the above-mentioned portion is masked by a masking or decorative strip so as to be invisible and not mar the appearance of the vehicle body.

In its most general form, the invention consists of securement means which, in the upper end located outside the contour of the vehicle body, are provided with engagement members 1 for interconnection with corresponding engagement members 2 disposed in a support foot 3 for a strut 4 included in the load carrier and extending transversely over the vehicle roof. The support foot 3 is supported on the vehicle roof 6 by means of a support pad 5 of elastic or yieldable material often pivotally secured in the support foot 3.

A load carrier of this type requires that the strut 4 be rigidly connected with the support foot 3 proper so that the distance between support feet 3 disposed at opposing edges of the vehicle body is established by the fastening position on the strut 4. In order to fixedly clamp such a load carrier on a vehicle roof, a clamping direction is required which encompasses components in both the horizontal direction in towards the longitudinal centre line of the vehicle roof, and in the vertical direction, i.e. in a direction up towards the strut 4. In FIG. 1, such a clamping direction is intimated by the broken line 7 and it should be emphasized that the inclination of this clamping direction in relation to the horizontal plane may vary quite considerably depending upon the vehicle body design.

With the above-indicated preconditions, the present invention implies that a securement means 8 is in positionally fixing engagement with a portion 9 projecting from the vehicle body, this portion being preferably constituted by a joint portion—as outlined above—between two body panels included in the vehicle body. According to the present invention, there are no other requirements than that the securement means 8 must be securely hooked in a positionally fixing manner or be in a corresponding positionally fixing engagement with the projecting portion 9 when the engagement member 1 is actuated in towards the support foot 3 in the clamping direction 7.

The above-outlined generic inventive concept also encompasses the possibility of positionally fixing the securement means 8, primarily when this is not being used for fastening a load carrier by engagement with a masking strip, a sealing strip or the like which covers that space where the projecting portion 9 of the body is located.

In the embodiment according to FIG. 1, the engagement member 2 of the support foot 3 is designed as a catch which is movable in the longitudinal direction of the clamping direction 7. The engagement member 1 on the securement means 8 is designed as an elongate cup which accommodates in itself a part of the engagement member 2 so that tension loading may thereby be transferred from the engagement member 2 to the engagement member 1.

The engagement member 1 of the securement means 8 is connected to the rest of the securement means 8 proper by the intermediary of a thin neck portion 10 which, in the embodiment shown on the Drawing, consists of a sheet strip which connects the engagement member 1 with remaining parts of the securement means 8. In this embodiment, the securement means is of an extent, in the flat plane of the Drawing, of the order of magnitude of between 5 and 15 cm.

The neck portion 10 extends through a slit-shaped aperture in beneath a masking strip 11 which, in the body type under consideration here, is employed to conceal the projecting portion 9 of the body. The contour line of a portion of a vehicle door connecting to the masking strip 11 is intimated by reference numeral 12.

Within the space behind/beneath the masking strip 11, the securement means 8 is provided with a catch-like portion 13 which may preferably extend throughout the entire longitudinal extent of the securement means and which grasps about the projecting portion 9 of the body. As a result of the configuration shown on the Drawing, it will be readily perceived that tightening in the engagement member 2 of the support foot 3 will realise tightening of the catch-like portion 13 about the projecting portion 9. It will further be readily perceived that an insignificant bending, deformation or deflection of the masking strip 11 will be sufficient to enable the neck portion 10 to extend in through the slit-shaped aperture thus formed, in to the projecting portion 9.

While, in most cases, the masking strip 11 is sufficient to positionally fix the securement means 8 when the load carrier of the vehicle is not mounted in place (approximately like a "transport lock"), there is provided, in this embodiment, a punched tongue 14 in the securement means 8 proper which extends obliquely down towards the catch-like portion 13 and which snaps in behind an angularly deflected portion on the projecting portion 9 of the body so that thereby the entire securement means 8 may be snapped into place on the projecting portion irrespective of any influence from the masking strip 11.

Thus, in the described embodiment, the securement means 8 consist of an approximately Z-shaped bent sheet strip or sheet profile which, in one and the same piece, includes the catch-like portion 13, the tongue 14, the neck portion 10 and the cup-shaped engagement member 1. Securement means 8 designed in this manner provide good mechanical strength and sit securely in a body of the illustrated type.

DESCRIPTION OF ALTERNATIVE EMBODIMENTS

In a modified embodiment of the above-described securement means, the catch-like portions 13 need not extend throughout the entire longitudinal extent of the securement means 8, but there may be provided a break at the central portion of the securement means so that thereby a slightly curved projecting portion 9 on the vehicle body will not result in the securement means resting and "rocking" because of the curvature in the projecting portion 9.

Figure 2:
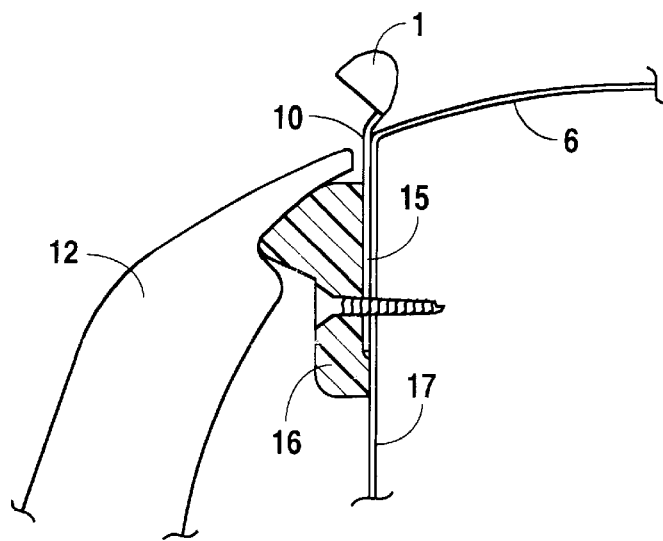
FIG. 2 is an illustration corresponding to that of FIG. 1 of a modified embodiment of the present invention, but without any details included in the load carrier proper.

In the embodiment according to FIG. 2, the securement means 8 are provided with an anchorage portion 15 which is lamellar in form and which, in its practical embodiment, may consist of a sheet strip. This anchorage portion is connected, by the intermediary of the neck portion 10, with the engagement member 1, and the neck portion 10 extends through a slit-shaped aperture between the vehicle roof 6 and a vehicle door 12 in connection therewith. Also in this embodiment, the engagement member is designed as a cup which is open obliquely downwardly and out towards the vehicle side, in which cup a corresponding engagement member on the support foot of the load carrier may be hooked.

According to the present invention, the anchorage portion 15 extends down between a sealing strip 16 and a panel 17 included in the vehicle body on which the sealing strip is secured by means of fastening devices such as screws 18. It is apparent from the Drawing Figure that the fastening devices which are intended to secure the sealing strip to the vehicle body 6, 17, are also employed for fastening the securement means 8 to the vehicle body.

Figure 3:
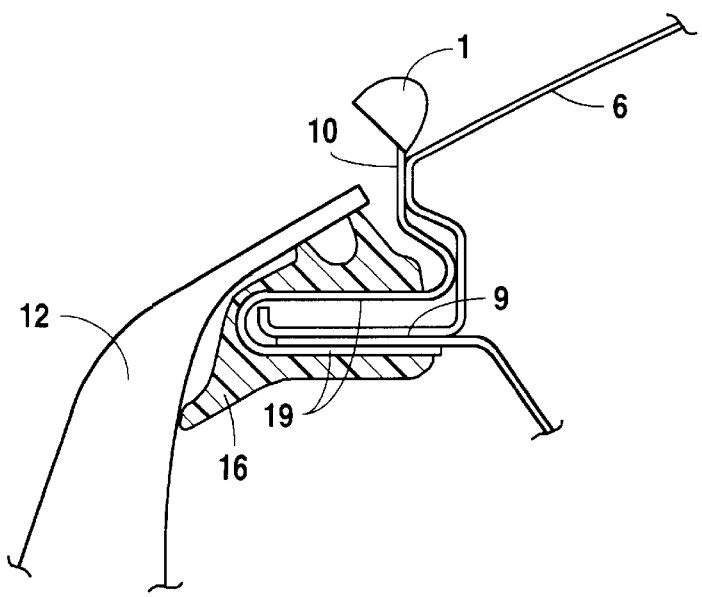
FIG. 3 is a view corresponding to that of FIG. 2 of yet a further embodiment of the present invention.

In the embodiment according to FIG. 3, reference numeral 6 refers to the vehicle roof, reference numeral 12 to the vehicle door and reference numeral 16 to a sealing strip for sealing against the vehicle door. Also in this embodiment, the vehicle body is provided with a laterally projecting portion 9, with an upwardly deflected end portion placed at the outer edge. This projecting portion 9 normally serves, in this embodiment, for securing the sealing strip 16, in that the sealing strip is provided with a slit-shaped pocket into which the projecting portion 9 extends.

Also in this embodiment, the securement means 8 is provided with a neck portion 10 which extends in to a region behind the vehicle door 12 and the sealing strip 16. Furthermore, the securement means is provided with a partially closed portion 19 which surrounds, in an approximately U-shaped manner, and accommodates the projecting portion 9 of the body so that the securement means is, as a result of this engagement, held positionally fixed on the body in the clamping direction.

In this embodiment, no specific arrangement is required according to the present invention to fix the securement means 8 on the body when this is not employed for fastening a load carrier, the sealing strip 16 instead catering for this fixture. For mounting the securement means 8, the sealing strip 16 is quite simply released from the projecting portion 9, whereupon the securement means 8 are slid into place and the sealing strip, with its slit-shaped aperture, is pressed back over both the securement means and the projecting portion of the vehicle body.

In all of the above-disclosed embodiments, the engagement member 1 on the securement means 8 has been described as being elongate and cup-shaped, but this configuration is not necessary according to the present invention. Instead, any optional configuration of engagement members may be employed which, with a suitable corresponding configuration of the engagement member of the support foot 3, permits a tensioning force transfer in the clamping direction 7. For example, the neck portion 10 may merge into an upwardly directed sheet tongue which is preferably slanted in towards the region above the longitudinal centre line of the vehicle and which is provided with a longitudinal slot in which a hook-like engagement member on the support foot 3 may be hooked in place.

In yet a further embodiment of the device according to the present invention, the securement means proper may, naturally, be designed in such a manner that no joint between the engagement member of the securement means and a corresponding engagment member 2 in the support foot is required. In such an embodiment, the securement means 8 may, therefore, be designed in such a manner that they may be directly hooked in position in a suitable clamping mechanism in the support foot 3 proper.

The present invention should not be considered as restricted to that decribed above and shown on the Drawings, many modifications being conceivable without departing from the spirit and scope of the appended claims.

I claim:

1. A device for fastening one type of load carrier onto a variety of vehicle models, the load carrier being provided with a strut extending transversely over the vehicle roof, a support foot which abuts against the vehicle roof and which transfers thereto the loading of the load carrier, and a clamping unit in the support foot, the clamping unit including an engagement member which, for fixedly securing the load carrier on the vehicle, is movable in a clamping direction substantially transversely of the longitudinal direction of the vehicle, the device comprising a neck portion which is at least partially disposed in a preexisting space behind masking or sealing strips on the vehicle, an anchorage portion for immovably anchoring the device on the vehicle, the anchorage portion being designed for anchoring the device on only preexisting portions of the vehicle such that the vehicle need only be modified to the extent that the device is anchored thereto, and a corresponding engagement member adapted to interconnect with the engagement member such that the corresponding engagement member is placed in tension when the engagement member is moved in the clamping direction, the neck portion, the corresponding engagement member, and at least one part of the anchorage portion being a single, integrated unit, the device being designed to remain fixed in position on the vehicle after removal of the load carrier such that the corresponding engagement member is permanently disposed outside of the contour of the vehicle, the one part of the anchorage portion being designed to be disposed in the preexisting space behind the masking or sealing strips; and the anchorage portions are provided with a catch-like portion which, in the clamping direction, is disposed to fixedly catch the device on a projecting portion of the vehicle body, and the anchorage portions are further provided with a locking portion extending towards the catch-like portion and, on fixedly catching the device, are disposed to snap or be bent in behind an angularly deflected edge portion on the projecting portion of the vehicle body.

2. A device for securing a support foot of one type of load carrier to a variety of vehicle models, comprising:

an engagement member for engagement with a support foot engagement member, the support foot engagement member being movable in a clamping direction substantially transversely relative to a longitudinal direction of the vehicle;

anchorage means for immovably fixing the device to the vehicle, the anchorage means being designed for fixing the device on only preexisting portions of the vehicle such that the vehicle need only be modified to the extent that the device is fixed thereto;

a neck portion extending between the engagement member and the anchorage means;

the engagement member of the device being placed in tension when the support foot engagement member moves in a clamping direction, the engagement member of the device being designed to be permanently disposed outside of the contour of the vehicle, and the engagement member of the device, at least a portion of the anchorage means, and the neck portion being a single, integrated unit, the device being designed to remain fixed on the vehicle after removal of the load carrier, the portion of the anchorage means and a part of the neck portion being disposed in preexisting spaces behind a masking or sealing strip of the vehicle; and the anchorage means includes a catching portion for fixedly catching the device on a projecting portion of the vehicle body, and a deformable locking portion for snapping or being bent behind an angularly deflected portion of the vehicle body.

3. A device for carrying loads on a variety of vehicle models comprising:

a load carrying unit, the load carrying unit including a strut extending over a top portion of the vehicle, a support foot attached to the strut for abutting the top portion of the vehicle, and clamping means in the support foot, the clamping means including a first engagement member, the first engagement member being movable in a clamping direction substantially transversely relative to a longitudinal direction of the vehicle;

securement means for securing the load carrying unit to the vehicle, the securement means including a second engagement member for engaging with the first engagement member and anchorage means for immovably fixing the securement means to the vehicle, the anchorage means being designed for fixing the securement means to only preexisting portions of the vehicles such that the vehicle need only be modified to the extent that the securement means is fixed thereto, and a neck portion extending between the second engagement member and the anchorage means, the second engagement member being designed to be permanently disposed outside of the contour of the vehicle;

the first engagement member being movable to engage with the second engagement member when the first engagement member is moved in the clamping direction, the second engagement member being placed in tension when the first engagement member is moved in the clamping direction, and the second engagement member, at least a portion of the anchorage means, and the neck portion being a single, integrated unit, the securement means being designed to remain fixed to the vehicle after removal of the load carrying unit, the portion of the anchorage means and a part of the neck portion being designed to be disposed in preexisting spaces behind a masking or sealing strip of the vehicle; and the anchorage means includes a catching portion for fixedly catching the device on a projecting portion of the vehicle body, and a deformable locking portion for snapping or being bent behind an angularly deflected portion of the vehicle body.

4. A vehicle with a disengageable load carrier, comprising:

a vehicle including a sealing or masking strip, the masking or sealing strip defining a space between the masking or sealing strip and a body of the vehicle;

a load carrying unit, the load carrying unit including a strut extending over a top portion of the vehicle, a support foot attached to the strut for abutting the top portion of the vehicle, and clamping means in the support foot, the clamping means including a first engagement member, the first engagement member being movable in a clamping direction substantially transversely relative to a longitudinal direction of the vehicle;

securement means for securing the first engagement member to the vehicle, the securement means including a second engagement member and anchorage means for immovably fixing the securement means to the vehicle, the anchorage means being designed for fixing the securement means on only preexisting portions of the vehicle such that the vehicle need only be modified to the extent that the securement means is fixed thereto, and a neck portion extending between the second engagement member and the anchorage means, the second engagement member being permanently disposed outside of a contour of the vehicle;

the first engagement member being engageable with the second engagement member when the first engagement member is moved in the clamping direction, the second engagement member being placed in tension when the first engagement member is moved in the clamping direction, and the second engagement member, at least a portion of the anchorage means, and the neck portion being a single, integrated unit, the securement means being fixed on the vehicle after removal of the load carrying unit, the portion of the anchorage means and a part of the neck portion being disposed in the space between the masking or sealing strip and the vehicle body; and the anchorage means include a catching portion for fixedly catching the device on a projecting portion of the vehicle body, and a deformable locking portion for snapping or being bent behind an angularly deflected portion of the vehicle body.

5. A vehicle with a disengageable load carrier comprising:

a vehicle including a masking or sealing strip, the masking or sealing strip defining a space between the masking or sealing strip and a body of the vehicle;

a load carrying unit, the load carrying unit including a support foot and a strut extending over a top portion of the vehicle, and clamping means in the support foot, the clamping means including a first engagement member, the first engagement member being movable in a clamping direction substantially transversely relative to a longitudinal direction of the vehicle;

securement means for securing the load carrying unit to the vehicle, the securement means including a second engagement member and anchorage means for immovably fixing the securement means, the anchorage means being designed for fixing the securement means on only preexisting portions of the vehicle such that the vehicle need only be modified to the extent that the securement means is fixed thereto, the anchorage means including a portion adjacent to and conforming substantially to the shape of a portion of the vehicle, and a neck portion extending between the second engagement member and the anchorage means, the second engagement member being permanently disposed outside of a contour of the vehicle;

the second engagement member being engageable with the first engagement member when the first engagement member moves in the clamping direction, the second engagement member being placed in tension when the first engagement member moves in the clamping direction, and the second engagement member, at least a portion of the anchorage means, and the neck portion being a single, integrated unit, the securement means being fixed on the vehicle after removal of the load carrying unit, the portion of the anchorage means and a part of the neck portion being disposed in the space between the masking or sealing strip and the vehicle body; and the anchorage means includes a catching portion for fixedly catching the device on a projecting portion of the vehicle body, and a deformable locking portion for snapping or being bent behind an angularly deflected portion of the vehicle body.

6. A vehicle with a disengageable load carrier comprising:

a vehicle including a masking or sealing strip, the masking or sealing strip defining a space between the masking or sealing strip and a body of the vehicle;

a load carrying unit, the load carrying unit including a support foot and a strut extending over a top portion of the vehicle, and clamping means in the support foot, the clamping means including a first engagement member, the first engagement member being movable in a clamping direction substantially transversely relative to a longitudinal direction of the vehicle;

securement means for securing the load carrying unit to the vehicle, the securement means including a second engagement member and anchorage means for immovably fixing the securement means, the anchorage means being designed for fixing the securement means on only preexisting portions of the vehicle such that the vehicle need only be modified to the extent that the securement means is fixed thereto, the anchorage means including a portion adjacent to and conforming substantially to the shape of a portion of the vehicle, and a neck portion extending between the second engagement member and the anchorage means, the second engagement member being permanently disposed outside of a contour of the vehicle;

the second engagement member being engageable with the first engagement member when the first engagement member moves in the clamping direction, the second engagement member being placed in tension when the first engagement member moves in the clamping direction, and the second engagement member, at least a portion of the anchorage means, and the neck portion being a single, integrated unit, the securement means being fixed on the vehicle after removal of the load carrying unit, the portion of the anchorage means and a part of the neck portion being disposed in the space between the masking or sealing strip and the vehicle body;

the anchorage means partly surrounds a projecting portion of the vehicle body and is at least partly fixed in position by the masking or sealing strip of the vehicle; and the anchorage means is fixedly hooked on projecting portion of the vehicle body.

* * * * *